Patented June 16, 1936

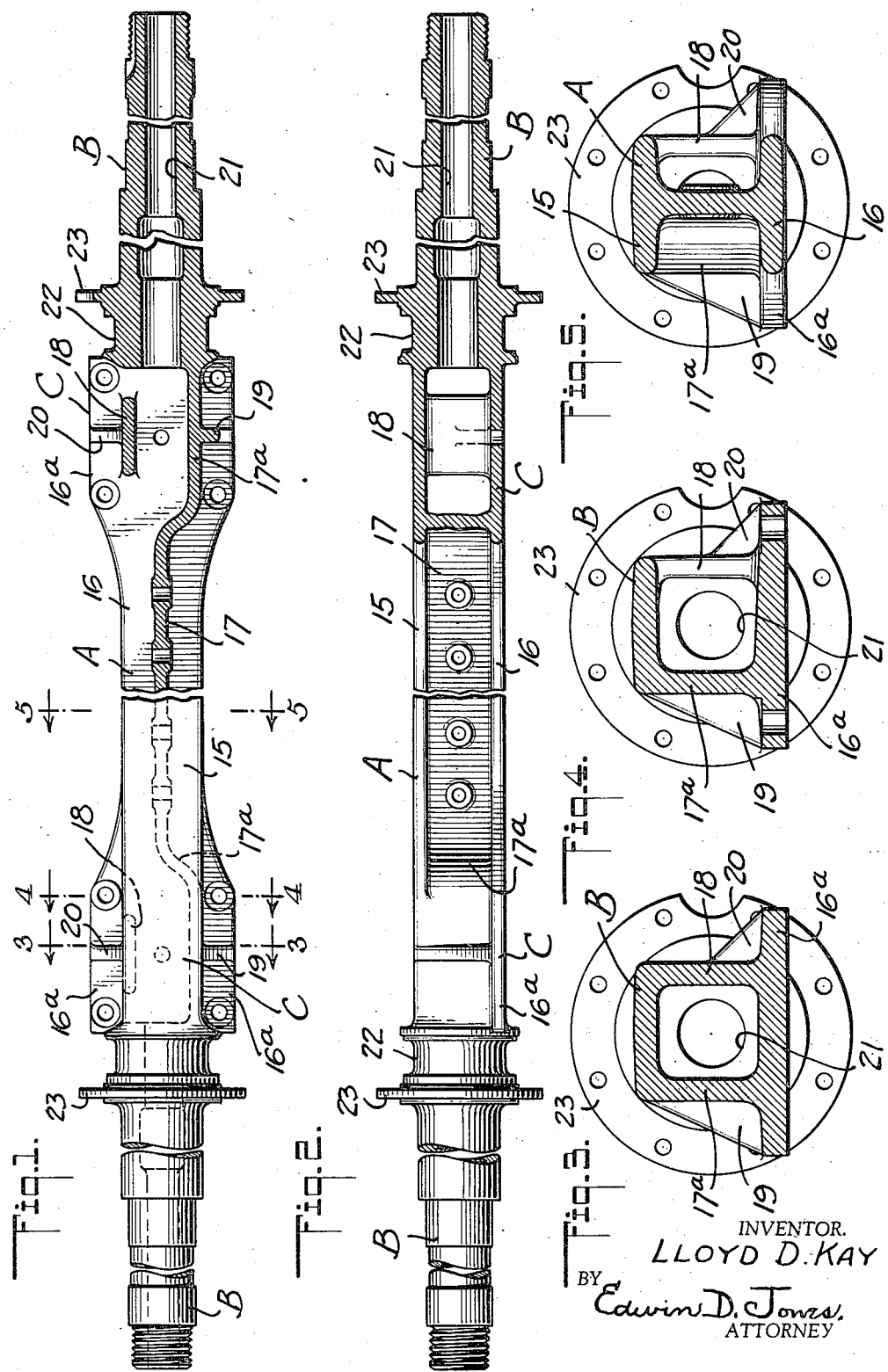

2,044,389

UNITED STATES PATENT OFFICE 2,044,389

VEHICLE AXLE

Lloyd D. Kay, Alhambra, Calif.

Application September 19, 1934, Serial No. 744,698

7 Claims. (Cl. 301—124)

It is a purpose of my invention to provide an axle particularly adapted, although not necessarily, for motor trucks, which is structurally characterized by a central portion of I-beam or other non-tubular construction, and end portions of tubular construction, all in a manner to attain maximum structural strength throughout and particularly in those regions of the axle which are subjected to the greatest transverse stresses.

It is also a purpose of my invention to provide an axle which, while having the structural characteristics above delineated, can be readily cast of steel or other metal as an integral structure of substantially uniform metal thickness, and in a manner to secure uniform contraction thereof during cooling of the casting to the end of eliminating molecular stresses and thereby preventing subsequent weakening of any part of the axle.

I will describe only one form of rear axle, rear wheel driving and brake mechanism, each embodying my invention, and will then point out the novel features thereof in claims.

In the accompanying drawing:

Fig. 1 is a view showing in top plan and partly in section, one form of rear axle embodying my invention.

Fig. 2 is a view similar to Fig. 1 showing the same axle in side elevation.

Figs. 3, 4, and 5 are transverse sectional views taken on the lines 3—3, 4—4, and 5—5, respectively, of Fig. 1.

Referring to the drawing, the rear axle here shown comprises a central portion A, end portions B, and intermediate portions C connecting the end portions to the central portion.

The central axle portion A is characterized structurally by its I-beam construction to give it lightness without sacrificing strength, although it will be understood that it may be made of other cross sectional and non-tubular contours without departing from the spirit of my invention. As shown, the central axle portion comprises upper and lower plates 15 and 16 of the same width and thickness, only where the bottom plate forms the bottom of the intermediate axle portions C, it is widened as indicated at 16$^a$ in Fig. 1. These plates are connected by a web 17 which is coextensive in length with the plates, and terminates at the inner ends of the end axle portions B. The web 17 forms one side wall of each of the intermediate axle portions C, but in order that a box-like structure may be given to the portions C, and for other reasons to be described hereinafter, the web is offset transversely as indicated at 17$^a$.

Each intermediate axle portion is made up of the plates 15 and 16 as previously described, with the offset web part 17$^a$ constituting one side wall of the axle portion, and another web 18 forming the other side wall thereof. Thus the four walls 15, 16, 17$^a$, and 18 all coact to form a box-like or square structure possessing great structural strength. The webs 17$^a$ and 18 are braced transversely by webs 19 and 20, respectively, which are tapered in width upwardly from the bottom plate 16, as best shown in Fig. 4.

Each end axle portion B comprises a tubular body having a bore 21 which is open at its opposite ends, although it may be closed at its outer end if desired. This variation in structure is mentioned, because the construction of the adjacent intermediate axle portion permits casting of the end axle portion with a closed outer end.

The outer wall of each end axle portion A is cast to provide a groove 22 at its inner end, and on the outer side of this groove a flange 23 is formed. To the outer side of the flange 23 the axle portion is shaped exteriorly to form a spindle to accommodate and support a wheel hub.

From the preceding structural description of my axle, it will be manifest that whether it is made of steel or any other suitable metal, it can be and is cast as an integral and unitary structure, the offset web parts 17$^a$ being disalined with respect to the bores 21, as best shown in Fig. 1, in order to permit adequate supporting of the cores within the mold, particularly the core parts for the tubular end portions. In this connection, the webs 18 terminate short of the inner ends of the end axle portions B, and are spaced from the web parts 17$^a$ so that sufficient portions of the cores employed in casting the axle, can be extended to effectively support the cores within the mold. This is true whether the bores 21 are open or closed. Also this axle structure permits ready pulling of the cores.

The completed axle is structurally characterized by being made of metal of substantially the same thickness throughout in order that uniform contraction of the metal will take place during cooling of the casting to avoid molecular stresses therein, and thus prevent weakening of any part of the axle. Further, the axle is also characterized by an I-beam center construction to attain lightness with strength, while the end axle portions are converted into tubular portions to form wheel spindles possessing great strength. An important characteristic of the axle is the box-like structure of the intermediate portions B, for it is by means of this structure that there is given that added strength to the axle at those regions along its length which constitute the fulcrum points in consequence of loads imposed on the axle spindles by the wheels, necessary to successfully withstand the resultant transverse stresses. Further, the intermediate axle portions B provide seats for springs by which the axle is suspended from the chassis or frame of the truck to which it is applied.

Although I have herein shown and described only one form of axle embodying my invention, it is to be understood that various changes and modifications may be made herein without departing from the spirit of my invention and the spirit and scope of the appended claims.

I claim:

1. An axle having tubular end portions; and a central portion of I-form connecting said end portions and longitudinally alined therewith, the web of said central portion having its end portions offset with respect to the bores of said end portions.

2. An axle having tubular end portions; and a central portion connecting said end portions and comprising upper and lower plates, the lower plate being widened at said end portions, and a web between said plates offset at its ends with relation to the bores of said end portions.

3. An axle having tubular end portions; and a central portion connecting said end portions and comprising upper and lower plates, a web between said plates offset at its ends with relation to the bores of said end portions, and other webs between said plates and spaced from the offset portions of the first mentioned web.

4. An axle having tubular end portions; and a central portion connecting said end portions and comprising upper and lower plates, a web between said plates offset at its ends with relation to the bores of said end portions, and other webs between said plates and spaced in parallelism from the offset portions of the first mentioned web to coact with the web and plates to form a box-like structure between said central and end portions.

5. An axle having tubular end portions; and a central portion connecting said end portions and comprising upper and lower plates, a web between said plates offset at its ends with relation to the bores of said end portions, and other webs between said plates and spaced from the offset portions of the first mentioned web, said lower plate being widened adjacent said end portions for the extension of spring bolts therethrough.

6. An axle having tubular end portions; and a central portion connecting said end portions and comprising upper and lower plates, a web between said plates offset at its ends with relation to the bores of said end portions, other webs between said plates and spaced from the offset portions of the first mentioned web, said lower plate being widened adjacent said end portions for the extension of spring bolts therethrough, and bracing webs secured to the offset ends of the aforementioned webs and to the widened part of said lower plate.

7. An axle, having; a central non-tubular portion including a vertical web co-extensive in length with said portion and having its end portions offset horizontally with respect to the intermediate portion thereof; and end portions alined longitudinally with the central portion and having open inner ends alined longitudinally with the intermediate portion of said web.

LLOYD D. KAY.